UNITED STATES PATENT OFFICE.

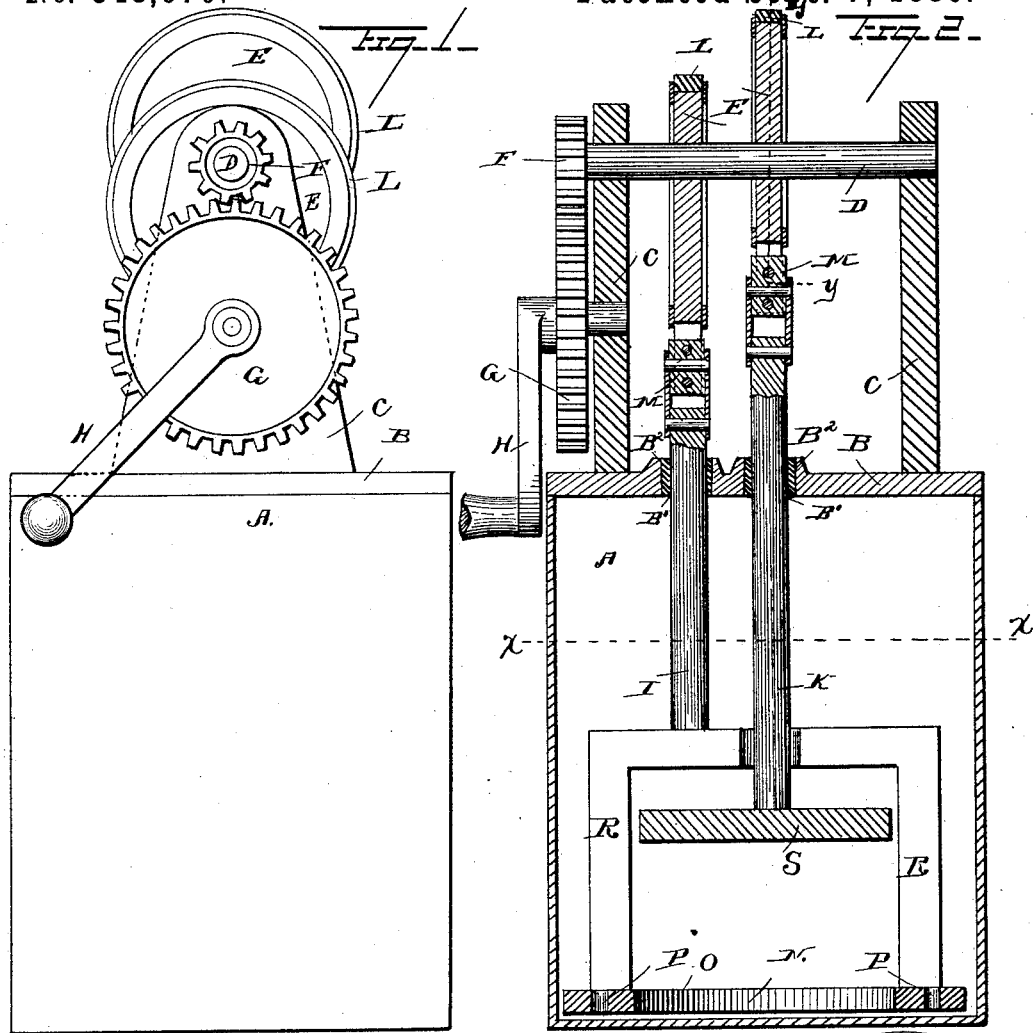

JOHN P. HACHENBERG AND ELIAS F. RADCLIFF, OF AUSTIN, MISSOURI.

CHURN.

SPECIFICATION forming part of Letters Patent No. 348,670, dated September 7, 1886.

Application filed June 23, 1886. Serial No. 206,027. (No model.)

*To all whom it may concern:*

Be it known that we, JOHN P. HACHENBERG and ELIAS F. RADCLIFF, citizens of the United States, residing at Austin, in the county of Cass and State of Missouri, have invented a new and useful Improvement in Churns, of which the following is a specification.

Our invention relates to an improvement in churns; and it consists in the peculiar construction and combination of devices that will be more fully set forth hereinafter, and particularly pointed out in the claim.

In the drawings, Figure 1 is an elevation of a churn embodying our improvements. Fig. 2 is a vertical sectional view of the same, taken on the plane at right angles to Fig. 1. Fig. 3 is a horizontal transverse sectional view taken on the line $x\ x$ of Fig. 2. Fig. 4 is a vertical transverse section on the line $y\ y$, Fig. 2.

A represents the body of the churn, which is of the ordinary construction, and B represents the lid or cover. From the said lid, at opposite sides of the same, project vertical standards C, in the upper ends of which is journaled a horizontal shaft, D. To the said shaft is attached a pair of eccentrics, E. The said eccentics extend from the shaft in opposite directions from each other. To one end of the shaft B is attached a spur-pinion, F.

G represents a large spur-wheel which is journaled to the outer side of one of the standards C, and is provided with a handle, H, by means of which it may be rotated. This wheel G meshes with the pinion F. In the cover B is made a pair of openings, B', through which extend the upper ends of dasher-rods I and K. These dasher-rods have their upper ends connected to eccentric straps L (which are passed around the eccentrics) by means of links M.

From the foregoing description it will be readily understood that when the wheel G is rotated the dasher-rods will be simultaneously reciprocated in opposite directions.

N represents a circular dasher, which is provided with a large central opening, O, and is also provided with a series of small openings or perforations, P, and from the upper side of the dasher extends a vertical yoke, R, which is attached to the lower end of the dasher-rod I, the said dasher-rod being attached to the horizontal portion of the yoke R, at one side of the center thereof.

S represents a dasher having radial blades T, which extend at right angles from each other. The said blades are flat and horizontal, and have their outer ends rounded. The diameter of the dasher S is such as to enable it to pass freely through the central opening of the dasher N.

$t$ represents a series of perforations with which the outer ends of the blades T are provided. The dasher S is attached to the lower end of the rod K. When the rods K and I are reciprocated, it will be seen that the dashers N and S move vertically in opposite directions at the same time, the dasher S passing through the central opening in the dasher N, thus very violently agitating the cream. The perforations in the dashers enable the cream to pass freely through them, thus securing a maximum agitation of the cream, and causing the same to be churned to butter in a short time.

In order to prevent the cream from working through the openings B' in the cover when the churn is in operation, we make the dasher-rods round and provide the cover with stuffing-boxes B², through which the said dashers pass.

We are aware that it has been heretofore proposed to construct a churn having a circular dasher provided with a central opening and a smaller dasher arranged to operate through the said opening, and means to reciprocate the dashers simultaneously in opposite directions, and this broadly we disclaim.

Having thus described our invention, we claim—

In a churn, the circular dasher N, having the large central opening and the perforations P, the vertical yoke R on its upper side, and the dasher-rod I, attached to the said yoke, in combination with the dasher S, adapted to pass through the central opening in the dasher N, and having the radial blades T, provided with the perforations $t$, and the rod K, attached to the center of the said dasher, and means to reciprocate the dashers simultaneously in opposite directions, substantially as described.

In testimony that we claim the foregoing as our own we have hereto affixed our signatures in presence of two witnesses.

JOHN P. HACHENBERG.
ELIAS F. RADCLIFF.

Witnesses:
M. E. SCHOOLEY,
D. A. WOODARD.